US008635856B2

(12) United States Patent
Beaucaire et al.

(10) Patent No.: US 8,635,856 B2
(45) Date of Patent: Jan. 28, 2014

(54) SYSTEM FOR DISABLING DIESEL PARTICULATE FILTER REGENERATION DURING ELECTRIC OPERATION

(75) Inventors: James T. Beaucaire, Glen Ellyn, IL (US); David V. Rodgers, Bloomingdale, IL (US); Paul A. Wieshuber, River Grove, IL (US); Michael A. Majewski, Joliet, IL (US); Paul L. Berke, Chicago, IL (US)

(73) Assignee: International Engine Intellectual Property Company, LLC, Lisle, IL (US)

( * ) Notice: Subject to any disclaimer, the term of this patent is extended or adjusted under 35 U.S.C. 154(b) by 184 days.

(21) Appl. No.: 12/705,172

(22) Filed: Feb. 12, 2010

(65) Prior Publication Data

US 2011/0197568 A1    Aug. 18, 2011

(51) Int. Cl.
*F01N 3/025* (2006.01)

(52) U.S. Cl.
USPC .................. 60/295; 60/285; 60/297; 60/311

(58) Field of Classification Search
USPC ......... 60/285, 295, 297, 311; 180/65.1, 65.21
See application file for complete search history.

(56) References Cited

U.S. PATENT DOCUMENTS

| | | |
|---|---|---|
| 5,533,487 A | 7/1996 | Cailey |
| 6,178,748 B1 | 1/2001 | Oleksiewicz |
| 6,401,700 B2 | 6/2002 | Balekai |
| 6,418,719 B2 | 7/2002 | Terry |
| 6,434,938 B1 | 8/2002 | Sun |
| 6,647,723 B1 | 11/2003 | Sun |
| 6,658,845 B1 | 12/2003 | Sun |
| 6,722,121 B2 | 4/2004 | Gui |
| 6,801,846 B1 | 10/2004 | Rodriguez |
| 6,826,905 B2 | 12/2004 | Gui |
| 6,973,786 B1 | 12/2005 | Liu |
| 6,978,604 B2 | 12/2005 | Wang |
| 6,985,808 B1 | 1/2006 | Kennedy |
| 7,000,393 B1 | 2/2006 | Wood |
| 7,117,843 B2 | 10/2006 | Liu |
| 7,124,582 B2 | 10/2006 | Kennedy |
| 7,131,271 B2 | 11/2006 | Bulicz |
| 7,152,588 B2 | 12/2006 | Corba |
| 7,257,950 B2 | 8/2007 | Iwaszkiewicz |
| 7,353,648 B2 | 4/2008 | Zhang |
| 7,484,503 B2 | 2/2009 | Wyatt |
| 7,562,528 B2 | 7/2009 | Wood |
| 7,631,489 B2 | 12/2009 | Liu |
| 8,035,532 B2 * | 10/2011 | Vosz ........................ 340/932.2 |
| 2006/0075995 A1 | 4/2006 | Liu |
| 2006/0123773 A1 | 6/2006 | Zhang |

(Continued)

*Primary Examiner* — Thomas Denion
*Assistant Examiner* — Jorge Leon, Jr.
(74) *Attorney, Agent, or Firm* — Jeffrey P. Calfa; Mark C. Bach

(57) ABSTRACT

A regeneration disable control system (22) of a vehicle having a power take off device (10) that is run off a motor (12) which is powered by at least one battery (14), and an engine (16) for recharging the at least one battery and for regenerating a diesel particulate filter (20), includes a hybrid controller (18). The hybrid controller (18) sends a signal to an engine controller (21) to indicate whether hybrid-PTO mode is enabled. If the hybrid-PTO mode is enabled, the engine controller (21) determines whether regeneration of the diesel particulate filter (20) is required. If regeneration is required, the engine controller (21) sends a signal to a regeneration inhibitor (30) to disable the engine (16) from initiating a regeneration event.

5 Claims, 2 Drawing Sheets

(56) References Cited

U.S. PATENT DOCUMENTS

| | | |
|---|---|---|
| 2006/0185353 A1 | 8/2006 | Liu |
| 2006/0218903 A1* | 10/2006 | Ogata ............................. 60/295 |
| 2006/0236693 A1 | 10/2006 | Wei |
| 2006/0266019 A1 | 11/2006 | Ricart-Ugaz |
| 2007/0056282 A1 | 3/2007 | Iwaszkiewicz |
| 2007/0175215 A1 | 8/2007 | Rowells |
| 2007/0175457 A1 | 8/2007 | Lyons |
| 2007/0234711 A1* | 10/2007 | Berke et al. ..................... 60/295 |
| 2007/0266705 A1 | 11/2007 | Wood |
| 2007/0271906 A1* | 11/2007 | Berke et al. ..................... 60/285 |
| 2007/0283696 A1 | 12/2007 | Lyons |
| 2007/0295007 A1 | 12/2007 | McNulty |
| 2008/0078176 A1 | 4/2008 | de Ojeda |
| 2008/0148727 A1 | 6/2008 | de Ojeda |
| 2008/0148728 A1 | 6/2008 | Wood |
| 2008/0184696 A1 | 8/2008 | Wyatt |
| 2008/0276602 A1* | 11/2008 | McCabe et al. ................. 60/295 |
| 2010/0223910 A1* | 9/2010 | Funk et al. ..................... 60/277 |

\* cited by examiner

SYSTEM FOR DISABLING DIESEL PARTICULATE FILTER REGENERATION DURING ELECTRIC OPERATION

FIELD OF THE INVENTION

The present invention relates generally to a system for disabling an engine from initiating regeneration of a diesel particulate filter, and more particularly, to a system for disabling the engine from initiating regeneration of the diesel particulate filter when an electric power take off system is enabled.

BACKGROUND OF THE INVENTION

Hybrid diesel vehicles include a power take off device powered by batteries. During extended periods of operation, the batteries need to be recharged by the engine. Thus, hybrid diesel vehicles require that the engine be employed in two competing ways. During recharge of the batteries, a hybrid controller controls the engine to run at a preset speed for about 5-minutes to recharge the batteries and to provide power to the power take off device. In contrast, the engine needs to be run about 15-20 minutes to provide sufficient exhaust gas heat to initiate a regeneration event of the diesel particulate filter.

A regeneration event is the periodic oxidation of collected particulate matter that is trapped in a diesel particulate filter during routine diesel engine operation. When the diesel particulate filter of the exhaust system experiences a build-up of particulate matter, the particulate matter is oxidized to "regenerate" the filter. Regeneration is initiated by increasing engine load and activating a post-injection of diesel fuel into the exhaust stream. This post-injection provides sufficient heat to oxidize the trapped particulate matter within the diesel particulate filter.

Hybrid vehicles use an electric power take off device (ePTO device) that is run off of the motor, and powered by batteries. During extended periods of ePTO operation, the batteries may require charging. When the batteries need to be charged, the hybrid controller will turn on the engine to recharge the batteries. Once this charging is completed, the hybrid controller shuts off the engine. A typical battery recharge cycle lasts about 5 minutes.

Regeneration should not be initiated when the engine is being controlled by the hybrid controller to recharge the batteries. While battery recharge requires the engine to be run for about 5-minutes, regeneration of the diesel particulate filter requires the engine to be run for about 15-20 minutes. If the engine were to recharge the batteries during the entire duration of a regeneration event, it would lead to an overcharge of the batteries. On the other hand, if the engine were to stop running once the batteries are charged while a regeneration event is occurring, the diesel particulate filter would not be effectively regenerated and could be irreparably damaged due to thermal shock.

SUMMARY OF THE INVENTION

A regeneration disable control system of a vehicle having a power take off device that is run off a motor which is powered by at least one battery, and an engine for recharging the at least one battery and for regenerating a diesel particulate filter, includes a hybrid controller. The hybrid controller sends a signal to an engine controller to indicate whether hybrid-PTO mode is enabled. If the hybrid-PTO mode is enabled, the engine controller determines whether regeneration of the diesel particulate filter is required. If regeneration is required, the engine controller sends a signal to a regeneration inhibitor to disable the engine from initiating a regeneration event.

DESCRIPTION OF A PREFERRED EMBODIMENT

Figure 1:
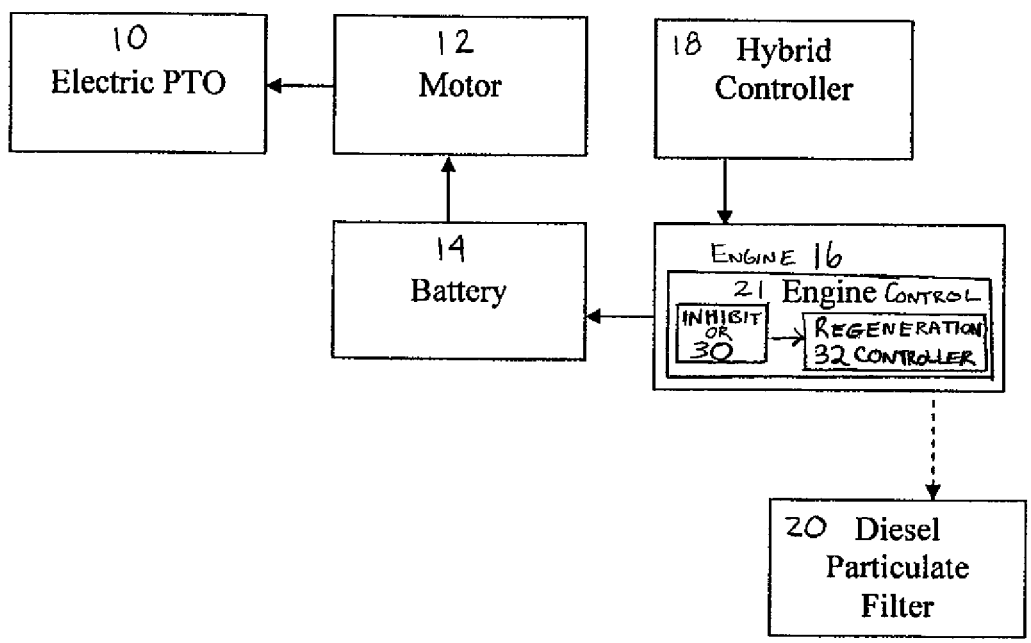
FIG. 1 is a schematic of an electric power take off device run off of a motor and powered by batteries, where the batteries are charged by an engine controlled by a hybrid controller and an engine controller, and a diesel particulate filter.
Figure 2:
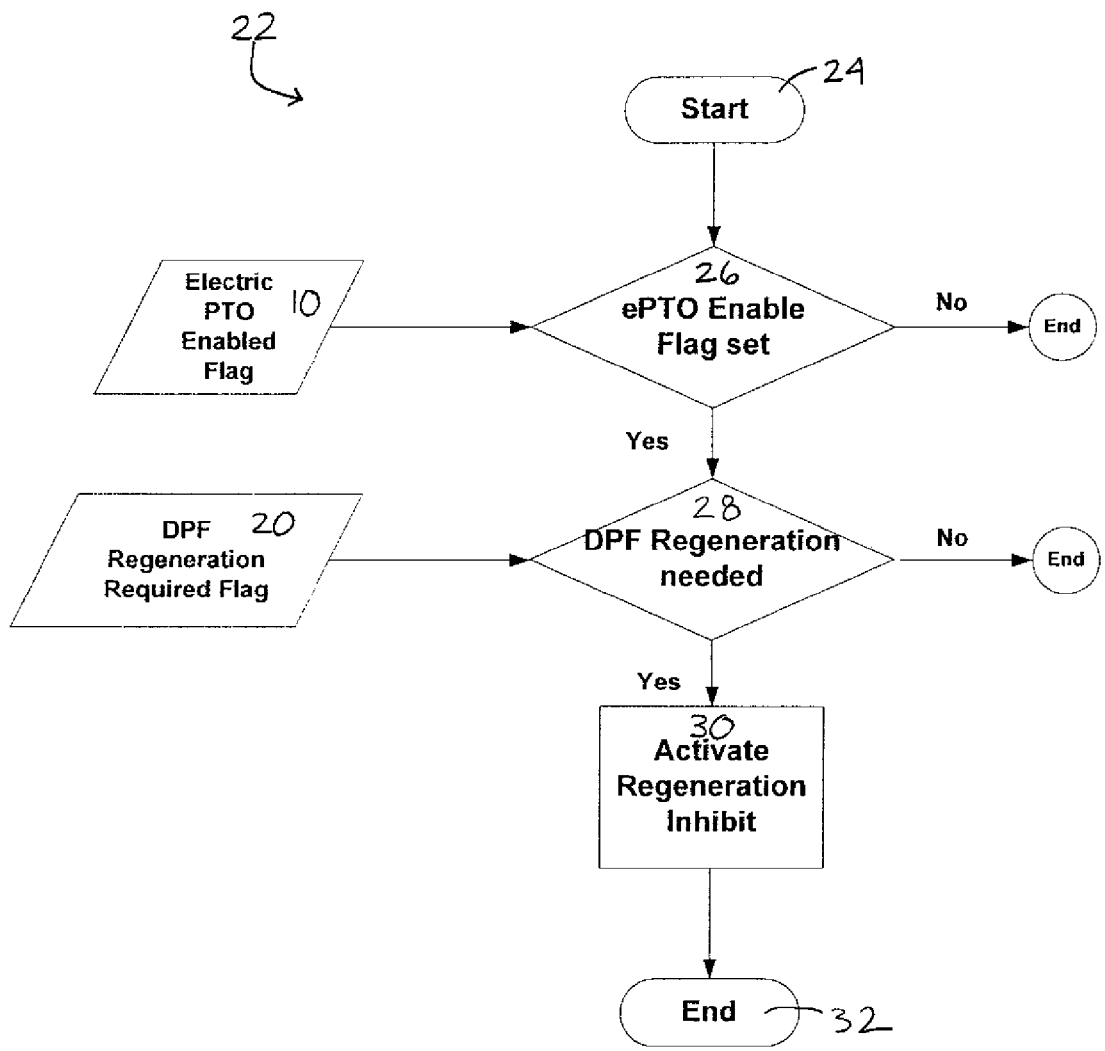
FIG. 2 is a schematic of a control system for disabling regeneration at a diesel particulate filter.

Referring to FIGS. 1 and 2, hybrid diesel vehicles include a power take off device 10 that is run off the motor 12, which is powered by at least one battery 14. Hybrid diesel vehicles also have an engine 16. When the power take off device 10 of the vehicle is run off the batteries 14, as opposed to the engine 16, the vehicle is in hybrid-PTO mode.

During extended periods of operation, the battery 14 needs to be recharged by the engine 16. The engine 16 is controlled by a hybrid controller 18 to operate the engine at a preset speed for about 5-minutes to recharge the at least one battery 14. The hybrid controller 18 is always on, however during hybrid-PTO mode, the engine 16 is off unless the batteries 14 are being recharged.

The vehicle also includes a diesel particulate filter 20 that requires regeneration. An engine controller 21 turns on the engine 16 for about 15-20 minutes to increase engine load and to activate a post-injection of diesel fuel into the exhaust stream.

If the engine 16 were to recharge the batteries 14 during the time-period required for a regeneration event, it would lead to an overcharge of the batteries. On the other hand, if the engine 16 were to stop running once the batteries 14 are charged while a regeneration event is occurring, the diesel particulate filter 20 would not be effectively regenerated and could be irreparably damaged due to thermal shock. To avoid the initiation of a regeneration event while the engine 16 is being controlled by the hybrid controller 18 to recharge the batteries 14, a regeneration disable control system 22 is provided at an engine controller 21.

The regeneration disable control system is indicated generally at 22 in FIG. 2. When the system is initiated 24, preferably at start-up of the vehicle, the system determines whether the electric power take off device 10 is enabled at 26. Specifically, a signal is sent from the hybrid controller 18 to the engine controller 21 to indicate that hybrid-PTO is enabled.

If the hybrid controller 18 does not send the signal to the engine controller 21 indicating that electric power take off device 10 is enabled (hybrid-PTO mode not enabled), the control system 22 ends or loops to the beginning at 24. If the signal indicating that the electric power take off device 10 is enabled (hybrid-PTO mode enabled), the engine controller 21 determines whether regeneration of the diesel particulate filter 20 is required at 28.

If regeneration is not required, the control system 22 ends or loops to the beginning at 24. If regeneration is required, the engine controller 21 sends a signal to a regeneration inhibitor 30 to disable the engine 16 from initiating a regeneration event.

The regeneration inhibitor 30 is preferably located in the engine controller 21 and provides a signal to a regeneration controller 32, also located at the engine controller. The regeneration controller disables the engine 16 from initiating a post-injection for the purposes of regenerating the diesel particulate filter 20.

After the regeneration event has been disabled, the control system 22 ends at 32 and preferably loops to the beginning at 24. It is contemplated that the logic for the regeneration disable control system can be stored at the engine controller 21.

With the regeneration disable control system 22, the engine 16 is disabled from initiating a regeneration event at the diesel particulate filter 20 while the battery 14 is being charged.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

What is claimed is:

1. A regeneration disable control system of a vehicle having a power take off device that is run off a motor which is powered by at least one battery, and an engine for recharging the at least one battery and for regenerating a diesel particulate filter, the regeneration disable control system comprising:
   a hybrid controller for sending a signal to an engine controller to indicate whether hybrid-PTO mode is enabled, wherein in hybrid-PTO mode the engine is one of on and off, wherein if hybrid-PTO mode is enabled, the engine controller determines whether regeneration of the diesel particulate filter is required;
   a regeneration inhibitor in communication with the engine controller, wherein if the engine controller determines that regeneration is required, the engine controller sends a signal to the regeneration inhibitor; and
   a regeneration controller in communication with the regeneration inhibitor, wherein if regeneration is required, the regeneration inhibitor provides a signal to the regeneration controller to disable the engine from initiating a regeneration event at the diesel particulate filter;
   wherein the regeneration controller disables the engine from initiating a post-injection which causes regeneration at the diesel particulate filter, wherein the engine continues to operate if the at least one battery is being recharged by the engine.

2. The regeneration disable control system of claim 1 wherein if the hybrid controller does not send the signal to the engine controller indicating that hybrid-PTO mode is enabled, the control system loops to receive the signal from the hybrid controller.

3. The regeneration disable control system of claim 1 wherein if the engine controller determines that regeneration is not required, the control system loops to receive the signal from the hybrid controller.

4. The regeneration disable control system of claim 1 wherein the regeneration inhibitor is located at the engine controller.

5. The regeneration disable control system of claim 1 wherein a control logic for the regeneration disable control system is located at the engine controller.

\* \* \* \* \*